United States Patent
Tsukamoto

(10) Patent No.: US 6,280,873 B1
(45) Date of Patent: Aug. 28, 2001

(54) WOUND BATTERY AND METHOD FOR MAKING IT

(75) Inventor: Hisashi Tsukamoto, Saugus, CA (US)

(73) Assignee: Quallion, LLC, Sylmar, CA (US)

(*) Notice: Subject to any disclaimer, the term of this patent is extended or adjusted under 35 U.S.C. 154(b) by 0 days.

(21) Appl. No.: 09/289,071

(22) Filed: Apr. 8, 1999

(51) Int. Cl.[7] .................... H01M 10/16; H01M 10/18
(52) U.S. Cl. ................... 429/94; 429/210; 429/231.94
(58) Field of Search ................ 429/94, 210, 127, 429/231.95

(56) References Cited

U.S. PATENT DOCUMENTS

| | | | |
|---|---|---|---|
| 5,162,172 | * 11/1992 | Kaun | 429/155 |
| 5,582,931 | * 12/1996 | Kawakami | 429/127 |
| 5,620,811 | 4/1997 | Zhang et al. | |
| 5,645,960 | 7/1997 | Scrosati et al. | |
| 5,658,684 | * 8/1997 | Lake | 429/162 |
| 5,733,681 | 3/1998 | Li et al. | |
| 5,750,288 | 5/1998 | Xie et al. | |
| 5,851,696 | 12/1998 | Saidi et al. | |

* cited by examiner

*Primary Examiner*—Carol Chaney
(74) *Attorney, Agent, or Firm*—Freilich, Hornbaker & Rosen

(57) ABSTRACT

A lithium battery made with a bipolar polyimide membrane with metal layers on each side, including one embodiment where the polyimide has a gold layer on each side. Different formulations for the positive electrode active material are used. The positive electrode active materials are essentially three substances: first, a lithium compound selected from the group consisting of $LiCoO_2$, $LiNiO_2$, and $LiMn_2O_4$; second, a powder selected from the group consisting of AB (acetylene black powder) and graphite; and third, PVDF (polyvinyldifluoride). The negative electrode active material consists essentially of two substances: the first is graphite powder; the second is PVDF (polyvinyldifluoride). The positive electrode metals include gold and aluminum. The negative electrode materials include gold, copper, nickel, titanium and iron. A separator layer of polyethylene is used so the battery layers can be wound. Because of the strength of the polyimide, the battery can be tightly wound. The energy density of the battery is about 300 Watt-hours per cubic centimeter.

15 Claims, 1 Drawing Sheet

WOUND BATTERY AND METHOD FOR MAKING IT

BACKGROUND OF THE INVENTION

1. Field of the Invention

This invention relates to small, high energy density batteries and how to make them. It relates to using thin sheets of plastic material coated with thin layers of dissimilar metals, which act as cathode and anode, so as to form a bipolar battery element. Also, it relates to coating the cathode and anode layers with thin layers of cathode-active and anode active material, respectively. It relates to tightly winding these layers; together with a separator plastic layer so as to have a high energy density battery.

2. Prior Art

Secondary lithium batteries have a much higher energy density than conventional batteries, such as lead-acid or Ni—Cd batteries, because of a high electrode potential and the lightweight of the lithium. Lithium, however, shows poor rechargeability in an organic electrolyte. The charge-discharge cycling efficiency of lithium is low. Although lithium can be used to make a high-energy battery, the high activity of lithium can also make the battery unsafe.

Xie et al., as part of the active cathode material (U.S. Pat. No. 5,750,288), used a transition metal nickel together with a non-transition metal selected from the group consisting of aluminum, gallium, tin and zinc. Instead of $LiNiO_2$, the combination $Li_xM_yO_z$ was used. The purpose was to increase the number of rechargeable cycles and to improve safety. Saidi et al. (U.S. Pat. No. 5,851,696) used a vanadium oxide nonmetal negative electrode (anode) instead of a solid lithium metal anode. This was done for manufacturing ease and to achieve a large discharge capability while maintaining integrity of the anode over a prolonged life cycle. Li et al. (U.S. Pat. No. 5,733,681) used a lithium manganese oxide cathode for a non-aqueous battery. Lithium manganese oxides are less of a toxicity concern and are relatively inexpensive.

Secondary lithium batteries using polymer electrolytes offer advantages over lithium ion batteries with liquid electrolytes, such as enhanced safety, long-cycle life, high energy density and flexibility. Composite electrodes for secondary lithium polymer batteries typically contain an electrode material providing active mass and a polymer electrolyte providing mechanical integrity and ionic conductivity. High conductivity for ions and electrons is needed for a high rate operation of the lithium battery. Good mechanical strength is necessary for processing and manufacturing. Prior art examples include Gozdz, et al. (U.S. Pat. No. 5,620,811) who used polyvinylidene fluoride; other polymers included in this survey are polyethylene oxide and polyacrylonitrile. Scrosati et al. (U.S. Pat. No. 5,645,960) formulated a thin film polymer battery having a flat discharge curve with either Li—$Ag_2WO_4$ or Li—$Cu_2WO_4$.

SUMMARY OF THE INVENTION

This invention utilizes a layered battery where a layer of plastic such as polyimide forms the divide between the positive electrode and the negative electrode so as to form a bipolar element. The polyimide layer thickness is in the range 0.3 $\mu$m to 50 $\mu$m, with a typical value of 9 $\mu$m. Gold or aluminum is deposited or plated or sputtered in a thin layer to form the metal conductive part of the positive electrode. The function of the metal deposited is to form a conductive layer. The positive electrode metal is then coated with a mixture of three substances, namely, a lithium transition metal oxide compound, a powder AB, and a compound PVDF. The lithium transition metal oxide compound is selected from the group consisting of $LiCoO_2$, $LiNiO_2$, and $LiMn_2O_4$. The powder AB is acetylene black powder. This is a form of carbon black, any form of which may be used. However, AB is a preferred embodiment. Graphite powder or any carbon black may be substituted for the AB component. PVDF is polyvinyldifluoride and is used with the solvent NMP (n methyl pyrrolidone).

The thickness of the metal layer may be about 0.3 $\mu$m to 3 $\mu$m for gold and for aluminum. The positive electrode active material layer may be in the range 20 to 100 $\mu$m thick with a preferred embodiment range of 30 $\mu$m to 80 $\mu$m. Plating or depositing or sputtering a metal layer on the side of the polyimide layer other than the positive electrode side is a first step in making the negative electrode. The metal is selected from a group consisting of gold, copper, nickel, titanium, and iron. The metal's function is to act as a conductor, primarily. The metal layer thickness is in the range 0.3 $\mu$m to 3 $\mu$m for gold, copper, nickel, titanium, and iron. The negative electrode metal is then coated with a mixture of graphite powder and PVDF. The negative electrode active material layer may be in the range 20 $\mu$m to 100 $\mu$m thick with a preferred embodiment range of 30 $\mu$m to 80 $\mu$m.

A separator sheet of a microporous film such as polyethylene may be placed over the mixture of the negative electrode. The layers can all be wound into a tight cylinder. Contacts are provided such that the negative and positive electrodes are attachable to feedthroughs in the case so there is a convenient way of accessing the power of the battery. Because there is only one sheet of material as the support for the positive and negative electrodes, and that sheet of polyimide is in the range of 0.3 $\mu$m to 50 $\mu$m, with a typical value of about 9 $\mu$m, the two thin layers of metal, are in the range 0.3 $\mu$m to 3 $\mu$m thick, while the active material layers are in the range 20 $\mu$m to 100 $\mu$m, with a thin polyethylene separating layer of about 27 $\mu$m, therefore the battery can be wound very tightly and a relatively higher energy density achieved. This is because the polyimide layer has a high tensile strength compared to a similar thickness of aluminum or copper. It is also because the thickness dimensions are all relatively small.

Arsenic, lead, platinum and zinc cannot be used as a metal plate in this invention because they react destructively with the active materials in the active layers.

Methods of getting the active materials onto the respective underlying metal layers include screen printing, where the "screen printing ink" is the active material, in a small amount of liquid vehicle, coating on the active material, and spraying on the active material.

A variation of the battery is using gold as the underlying metal for both positive and negative electrodes.

BRIEF DESCRIPTION OF THE DRAWINGS

The above and other features and advantages of the invention will be more apparent from the following detailed description wherein.

DETAILED DESCRIPTION OF THE PREFERRED EMBODIMENT

The following description is of the best mode presently contemplated for carrying out the invention. This description is not to be taken in a limiting sense, but is merely made for the purpose of describing the general principles of the invention. The scope of the invention should be determined with reference to the claims.

This invention utilizes a layered battery where a layer of plastic such as polyimide forms the divide between the positive electrode and the negative electrode so as to form a bipolar element. A separator sheet of a microporous film such as polyethylene may be placed over the mixture of the negative electrode. The layers can all be wound into a tight cylinder. Contacts are provided such that the negative and positive electrodes are attachable to feedthroughs in the case so there is a convenient way of accessing the power of the battery. See related U.S. patent application Ser. No. 19/290, 012, now abandoned.

Figure 1A:
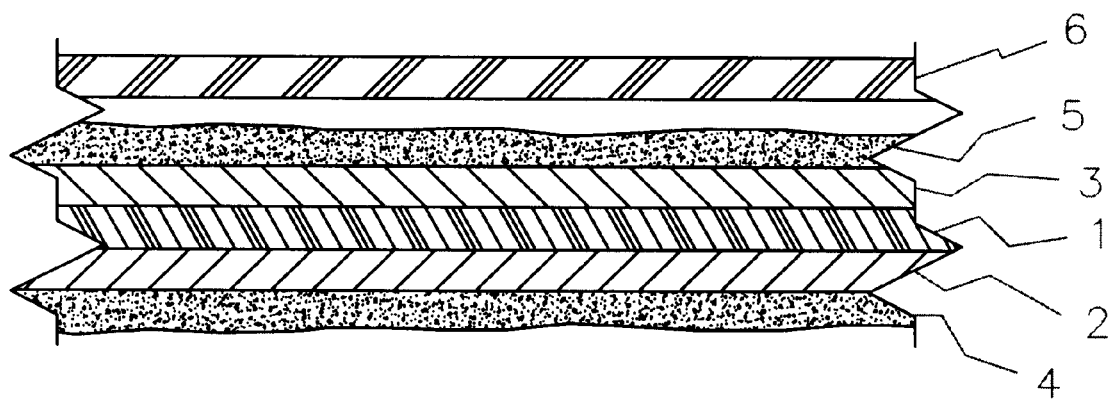
FIG. 1a shows the battery layers in an unwound, flat position.

This invention utilizes a layered battery where a layer of plastic such as polyimide forms the divide between the positive electrode and the negative electrode so as to form a bipolar element. The basic layer of polyimide (1) is shown in FIG. 1. Polyimide is chosen because of its relatively high tensile strength in a relatively thin layer. The tensile strength of the polyimide (1) is used to tightly wind the battery layers into a cylindrical format. The polyimide layer (1) thickness is in the range 0.3 $\mu$m to 50 $\mu$m, with a typical value of 9 $\mu$m.

The positive and negative electrodes are formed first by sputtering on a metal onto the polyimide, one side for the positive electrode and the other for the negative electrode. In FIG. 1, (2), the positive electrode metal, is a metal selected from the group consisting of gold and aluminum. Gold or aluminum is vapor deposited, chemically or physically, plated or sputtered in a thin layer to form a conductive part of the positive electrode. The function of the metal deposited is to form a conductive layer. The thickness of the metal layer may be about 0.3 $\mu$m to 3 $\mu$m for gold and for aluminum. Aluminum, however, is difficult to work with in terms of plating.

The positive electrode metal is then coated with a mixture of three substances, a lithium transition metal oxide compound, a powder AB, and the compound PVDF. The lithium transition metal oxide compound is selected from the group consisting of LiCoO2, LiNiO2, and LiMn2O4. AB is acetylene black, from the smoke of an acetylene torch. This is a form of carbon black, any form of which may be used. However, AB is a preferred embodiment. Graphite powder or any carbon black may be substituted for the AB component. PVDF is polyvinyldifluoride and is used with the solvent NMP (n methyl pyrrolidone). This positive electrode active layer is shown as (4) in FIG. 1. Screen painting, coating or spraying on a mixture of graphite powder and PDVF constructs the positive electrode active layer. This is shown as (4). The positive electrode active material layer is in the range 20 $\mu$m to 100 $\mu$m thick with a preferred embodiment range of 30 $\mu$m to 80 $\mu$m. A typical value may be 60 $\mu$m.

Plating or depositing or sputtering a metal layer on the side of the polyimide layer other than the positive electrode side is a first step in making the negative electrode. The metal is selected from a group consisting of gold, copper, nickel, titanium, and iron. The metal's function is to act as a conductor, primarily. The metal plate thickness is in the range 0.3 $\mu$m to 3 $\mu$m for gold, copper, nickel, titanium, and iron. As shown, (3) is the negative electrode metal.

The negative electrode metal is then coated with a mixture of graphite powder and PVDF. The negative electrode active material layer may be in the range 20 $\mu$m to 100 $\mu$m thick with a preferred embodiment range of 30 $\mu$m to 80 $\mu$m. A typical value may be 70 $\mu$m.

Figure 1B:
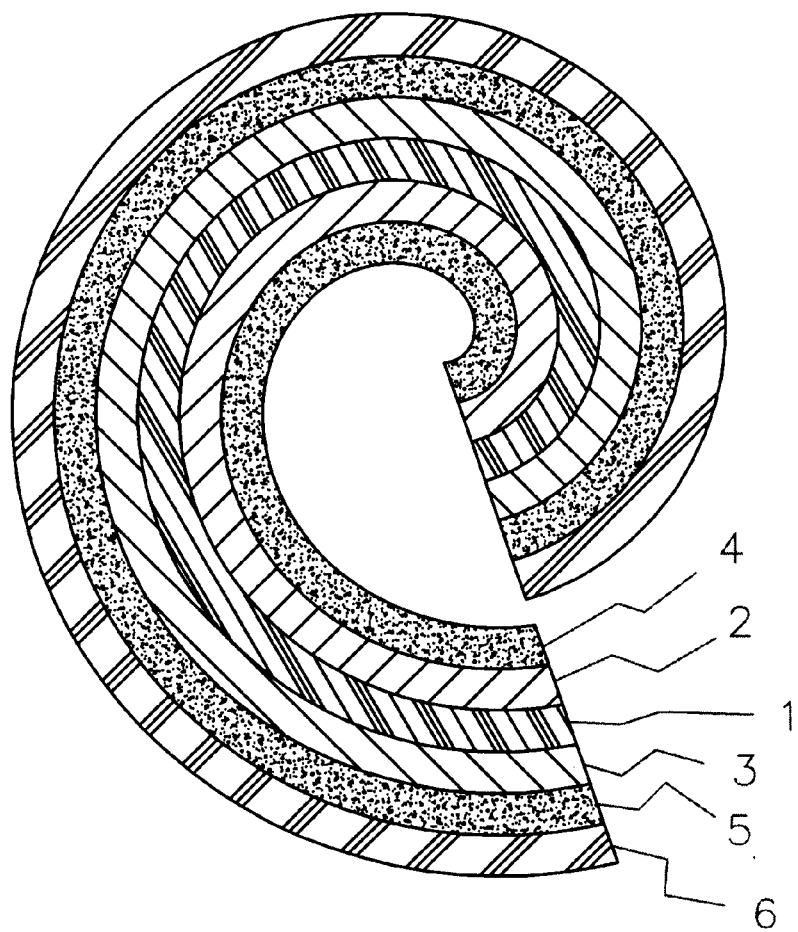
FIG. 1b shows the beginning parts of the battery layers at the start of a winding.

A layer of a microporous material (6) such as polyethylene is used as a separator (6). It is placed on the negative electrode (S) so as to isolate the positive electrode active material from the negative electrode active material (4) when the various layers are tightly wound so as to form a compact battery core as can be seen in FIG. 1b.

In an another aspect of this invention, both metal layers (2, 3) are of gold. The gold tends neither to become oxidized by the active material nor to dissolve in it. The electrochemical potential arises from the differences in the active materials of the positive electrode and the negative electrode.

Because there is only one sheet of material as the support for the positive and negative electrodes, and that sheet of polyimide is about 0.3 $\mu$m to 50 $\mu$m, the two thin layers of metal, are in the range 0.3 $\mu$m to 3 $\mu$m thick, while the active material layers are in the range 20 $\mu$m to 100 $\mu$m, with a thin polyethylene separating layer in the range 20 $\mu$m to 30 $\mu$m, therefore the battery can be wound very tightly and a relatively higher energy density achieved. This is because the polyimide layer has a high tensile strength compared to a similar thickness of aluminum or copper. It is also because the thickness dimensions are all relatively small. This new battery has an energy density of about 300 Watt-hours per cubic centimeter.

While the invention herein disclosed has been described by means of specific embodiments and applications thereof, numerous modifications and variations could be made thereto by those skilled in the art without departing from the scope of the invention set forth in the claims.

What is claimed is:

1. A lithium battery comprising:
  a flexible multilayer strip defining orthogonal width and length dimensions, said strip being tightly wound around an axis oriented parallel to the width of said strip, said strip including:
    a flexible plastic substrate defining first and second parallel surfaces;
    a positive electrode conductive layer formed on said substrate first surface continuously extending along the length of said substrate;
    a negative electrode conductive layer formed on said substrate second surface continuously extending along the length of said substrate;
    a positive active material layer carried by and continuously extending along the length of said positive electrode layer, said positive active material layer including a lithium metal oxide;
    a negative active material layer carried by and continuously extending along the length of said negative electrode layer; and
    a separator layer formed on and continuously extending along the length of at least one of said active material layers for separating said positive and negative active material layers when said strip is tightly wound.

2. The battery of claim 1 wherein said plastic substrate comprises polyimide.

3. The battery of claim 1 wherein said plastic substrate has a thickness of between 0.3 $\mu$m and 50 $\mu$m.

4. The battery of claim 1 wherein said positive electrode conductive layer is comprised of a material selected from the group consisting of gold and aluminum.

5. The battery of claim 1 wherein said positive electrode conductive layer has a thickness of between 0.3 $\mu$m and 3.0 $\mu$m.

6. The battery of claim 1 wherein said positive active material layer has a thickness of between 20 $\mu$m and 100 $\mu$m.

7. The battery of claim 1 wherein said negative electrode conductive layer is comprised of a material selected from the group consisting of gold, copper, nickel, titanium and iron.

8. The battery of claim 1 wherein said negative electrode conductive layer has a thickness of between 0.03 $\mu$m and 3.0 $\mu$m.

9. The battery of claim 1 wherein said negative active material layer has a thickness of between 20 $\mu$m and 100 $\mu$m.

10. The battery of claim 1 wherein said separator layer comprises a polyethylene sheet having a thickness of between 20 $\mu$m and 30 $\mu$m.

11. The battery of claim 1 wherein at least one of said conductive layers is sputtered onto said substrate.

12. The battery of claim 1 wherein at least one of said conductive layers is electroplated onto said substrate.

13. The battery of claim 1 wherein at least one of said conductive layers is formed on said substrate by vapor deposition.

14. The battery of claim 1 wherein said positive active material layer includes a lithium metal oxide selected from the group consisting $LiCoO_2$, $LiNiO_2$, and $LiMn_2O_4$.

15. The battery of claim 1 wherein said negative active material layer is comprised of graphite powder and PVDF.

\* \* \* \* \*

UNITED STATES PATENT AND TRADEMARK OFFICE
CERTIFICATE OF CORRECTION

PATENT NO. : 6,280,873 B1
DATED : August 28, 2001
INVENTOR(S) : Hisashi Tsukamoto It is certified that error appears in the above-identified patent and that said Letters Patent is hereby corrected as shown below:

Column 4,
Line 3, change "(S)" to -- (5) --.

Signed and Sealed this

Twenty-second Day of June, 2004

JON W. DUDAS
*Acting Director of the United States Patent and Trademark Office*